(No Model.) 2 Sheets—Sheet 1.

E. B. DENNISON.
FLUID PRESSURE BRAKE.

No. 458,101. Patented Aug. 18, 1891.

Witnesses
G. S. Elliott
E. W. Johnson

Edwin B. Dennison.
Inventor
by
Attorney (No Model.) 2 Sheets—Sheet 2.

E. B. DENNISON.
FLUID PRESSURE BRAKE.

No. 458,101. Patented Aug. 18, 1891.

Witnesses

Edwin B. Dennison.
Inventor

UNITED STATES PATENT OFFICE.

EDWIN B. DENNISON, OF PINE GROVE, CALIFORNIA.

FLUID-PRESSURE BRAKE.

SPECIFICATION forming part of Letters Patent No. 458,101, dated August 18, 1891.

Application filed March 12, 1891. Serial No. 384,700. (No model.)

*To all whom it may concern:*

Be it known that I, EDWIN B. DENNISON, a citizen of the United States of America, residing at Pine Grove, in the county of Amador and State of California, have invented certain new and useful Improvements in Fluid-Pressure Brakes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in fluid-pressure brakes.

The object of the invention is to provide a brake for cars which will be entirely under the control of the engineer, and in which the brake-cylinder, containing two pistons, will serve as a reservoir to contain the compressed fluid, which moves the brake-lever in an opposite direction from which it is actuated by pressure introduced through the main pipe; and it consists in the construction and combination of the parts, as will be hereinafter fully set forth, and particularly pointed out in the claims.

By means of a fluid-pressure brake constructed as described herein I am enabled to apply the brakes to the car-wheels with the desired degree of pressure, retain in the reservoir and brake-cylinder fluid under pressure for use when desired, and at the same time do away with springs for taking off the brakes. I also dispense with valves, except in the engineer's cab and in the pipe connecting the reservoir and brake-cylinder with the train-pipe.

Figure 1:
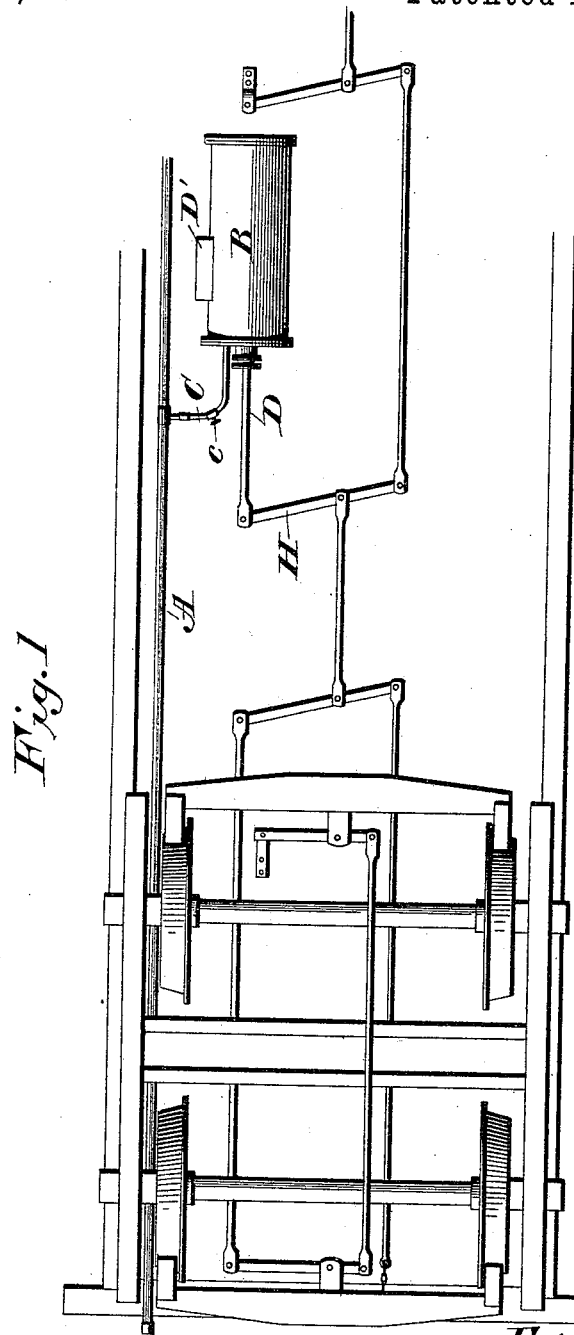
Figure 2:
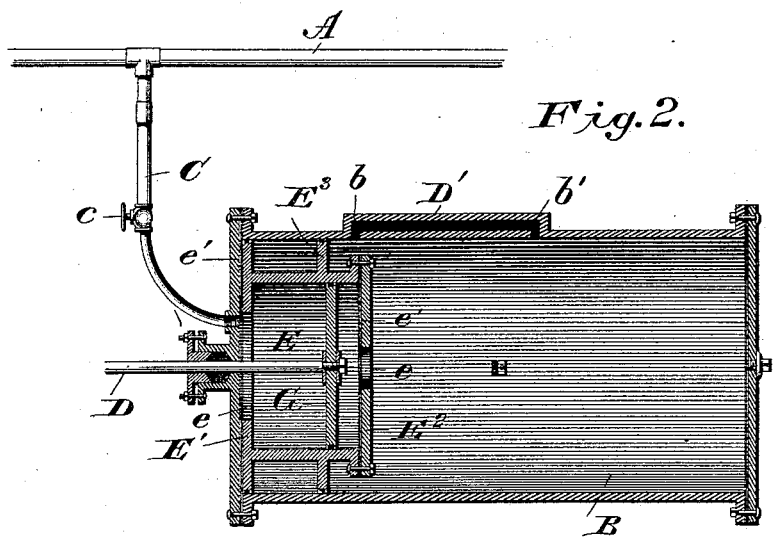
Figure 3:
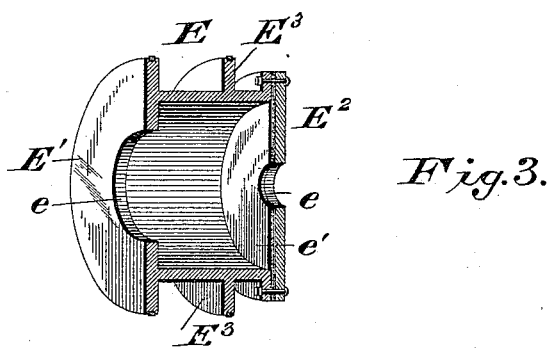

In the accompanying drawings, forming part of this specification, Figure 1 is an inverted plan view showing my improved brake mechanism applied to a car. Fig. 2 is a longitudinal sectional view. Fig. 3 is a detail view of the compound piston.

A refers to the train-pipe, which conveys suitable fluid under pressure, as air or steam, from the locomotive to the reservoir and brake-cylinder B, each car being provided with a reservoir and brake-cylinder, which is connected with the train-pipe A by a branch pipe C, which leads into one end of the reservoir and brake-cylinder B and is provided with a suitable valve $c$ for cutting off communication with the train-pipe A when it is desired to switch the cars. The system of levers connected with the piston-rod D is such as is usually employed, and may also be connected, if desired, to the hand-brake mechanism. The piston-rod D passes into the reservoir and brake-cylinder through a stuffing-box secured to its head and carries the brake-piston G, which operates in a supplemental cylinder playing within the main cylinder or reservoir B. The inner cylinder E is provided with heads E' and $E^2$, each of which has a central opening $e$, the one in the head E' permitting compressed air from the main pipe A to enter the inner cylinder through the connection C. These cylinder-heads are provided with suitable packings $e'$ to present air-tight connections. The cylinder-head E' is extended to fit snugly within the outer or main cylinder B, and near the opposite end of the said inner cylinder is a flange $E^3$, of the same diameter as the head E', the peripheries of these parts being provided with suitable packing.

Upon one side of the cylinder B is a chest D', having a passage-way which connects with said cylinder through the ports $b$, located at each end of said chest.

In operation air or steam under pressure is let into the pipe A, passes therefrom through the connection C, and forces the piston G against the head $E^2$, after which the cylinder E is moved from its seat against the cylinder-head of the outer or main cylinder until the head E' passes the port $b$, when the compressed air will pass into the chest D' and out of the other port $b'$ to equalize the pressure on each side of the brake-piston G, in which position the brakes will be off. When it is desired to put on the brakes, the valve in the cab connected with the train-pipe A is opened, when the pressure in front of the brake-piston G is relieved and the compressed air in the reservoir and brake-cylinder acting upon the piston-valve cylinder E will force the same against the head of the reservoir and brake-cylinder to cut off the exit-passage of the by-pass D', after which the brake-piston G will be acted upon through the opening $e$ to throw the lever H, the throw of said lever being regulated by the pressure in front of the piston. When it is desired to uncouple the cars, the valve $c$ can be turned to cut off communication with the train-pipe until the train is made up. It will be seen that by this construction I may vary the amount of pressure put on the brakes by varying the amount of pressure from the train-pipe in front of the piston. The cushions $e'$ upon the inner cylinder-heads will take up any sudden shock or jar which may be occasioned in operation.

I am aware that prior to my invention it has been proposed to operate brakes as shown in patent to H. Knapp, dated June 4, 1878, No. 204,440, and Westinghouse, July 22, 1879, No. 217,836; but in these instances reservoirs are employed and the piston-rod is provided with two pistons which operate in different cylinders, which I dispense with in my construction.

This device is simple and is not liable to get out of order, and by means of the same an engineer can apply the brakes to the cars with the desired amount of pressure, and by using stored pressure it will be readily discovered when the brakes are not operating.

Having thus described my invention, what I claim as new, and desire to secure by Letters Patent, is—

1. In an air-brake apparatus, the combination of the train-pipe connected to a reservoir and brake-cylinder having a by-pass and ports $b\ b'$, and a piston-valve cylinder movable within the reservoir and brake-cylinder beyond the port $b$, the piston-valve cylinder being connected to a piston-rod which connects with the brake-levers, substantially as set forth.

2. In combination with a combined reservoir and brake-cylinder B, having a by-pass and ports, a piston-valve cylinder, the heads of which are centrally apertured, and a brake-piston G, located within the piston-valve cylinder and provided with a piston-rod, together with a connection between the reservoir and brake-cylinder and train-pipe having a cut-off valve, substantially as set forth.

3. In combination with a combined reservoir and brake-cylinder B, having a by-pass and ports $b\ b'$, located to one side of the center thereof, a movable brake-piston, and a piston-valve cylinder contained within the reservoir and brake-cylinder, together with cushions on the heads of the piston-valve cylinder, said heads being apertured to permit the compressed air from the connection C to act directly upon the brake-piston, substantially as set forth.

4. In a fluid-pressure-brake mechanism, the combination of a reservoir and brake-cylinder having ports $b\ b'$, a piston-valve cylinder E, having an extended head $E'$ and a flange $E^3$, which fit snugly within the reservoir and brake-cylinder and are provided on their peripheries with a packing, and a piston located within said piston-valve cylinder and acted upon through the openings $e$, the piston-rod of which connects with the brake-operating levers, together with a supply-pipe C for admitting pressure to the cylinders, substantially as set forth.

In testimony whereof I affix my signature in presence of two witnesses.

EDWIN B. DENNISON.

Witnesses:
SARAH ROSS,
BENJAMIN ROSS.